(12) United States Patent
Spinner

(10) Patent No.: US 6,314,104 B1
(45) Date of Patent: Nov. 6, 2001

(54) BROADBAND SIGNALLING

(75) Inventor: Arno Spinner, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/043,971

(22) PCT Filed: Oct. 4, 1996

(86) PCT No.: PCT/SE96/01260

§ 371 Date: Jul. 10, 1998

§ 102(e) Date: Jul. 10, 1998

(87) PCT Pub. No.: WO97/13351

PCT Pub. Date: Apr. 10, 1997

(30) Foreign Application Priority Data

Oct. 6, 1995 (SE) ................................. 9503480

(51) Int. Cl.[7] ................................. H04L 12/56
(52) U.S. Cl. ............... 370/395; 370/410; 370/522
(58) Field of Search ................... 370/410, 355, 370/352, 522, 395, 396, 397, 392, 399, 465, 466, 467

(56) References Cited

U.S. PATENT DOCUMENTS

| | | | |
|---|---|---|---|
| 5,351,286 | * 9/1994 | Nici | 379/94 |
| 5,440,551 | 8/1995 | Suzuki | 370/395 |
| 5,678,008 | * 10/1997 | Hin | 395/200.12 |

FOREIGN PATENT DOCUMENTS

WO 05/06991  3/1995  (WO) .

OTHER PUBLICATIONS

Summary of ITU–T Recommendation Q.2761, "Broadband Integrated Services Digital Network (B–ISDN)—Functional Description of the B–ISDN User Part (B–ISUP) of Signalling System No. 7", Feb. 1995.

Summary of ITU–T Recommendation Q.2762, "Broadband Integrated Services Digital Network (B–ISDN)—General Functions of Messages and Signals of the B–ISDN User Part (B–ISUP) of Signalling System No. 7", Feb. 1995.

Summary of ITU–T Recommendation Q.2763, "Broadband Integrated Services Digital Network (B–ISDN)—Signalling System No. 7 B–ISDN User Part (B–ISUP)—Formats and Codes", Feb. 1995.

"11.4 ATM–Based Applications" pp. 337 and 338.

"9.6.3 Point–to–Point Call Setup and Release Examples", pp. 269–270.

"Proposed Initial Draft for Q.27CC (Multiconnection Call)", Q.27CC Editors, Study Group 11, Geneva, Apr. 24–May 12, 1995.

ITU–T Q.2764, "B–ISDN Application Protocols of the Network", pp. 1–79, Feb. 1995.

* cited by examiner

*Primary Examiner*—Chau Nguyen
*Assistant Examiner*—Soon-Dong Hyun
(74) *Attorney, Agent, or Firm*—Burns, Doane, Swecker & Mathis, L.L.P.

(57) ABSTRACT

A method and means for generating a connection correlation identifier (CCID) in multiconnection calls over broadband networks is provided. Signalling with the CCID takes part at the users interface. The connection correlation identifier coordinates the individual connections with the respective multiconnection call. The CCID includes two parts, and originating part (OCCID) and a destination part (DCCID), where the OCCID is generated at the calling party and where the DCCID is generated at the called party.

7 Claims, 7 Drawing Sheets

1. Setup of the first connection

2. Setup of the second connection

1. Setup of the first connection

2. Setup of the second connection

BROADBAND SIGNALLING

TECHNICAL FIELD OF THE INVENTION AND DESCRIPTION OF RELATED ART

When using a broadband network, different types of calls could be set up. For example B-ISDN standards offers both ordinary point to point calls between two users, but also point to multipoint calls. New signaling standards are continuously set by ITU-T concerning the ATM environment. In the closest future new standards regarding point to point multiconnection calls will be set. The need for point to point multiconnection calls occurs when several connections have to be established within one single call between two users. Multimedia is one application where this technique is applicable, for example to send video on one channel, speech on a second and data on a third channel. Video on demand could be another adequate application.

Multiconnection calls per se are already known as a service in B-ISDN. The provision of multiconnection calls requires special parameters, for example the originating Call Identifier (OCID) and the Destination Call Identifier (DCID). The OCID is assigned by an originating local exchange prior to establishment of a multiconnection call. It is used to identify the call association between originating and destination local exchanges. The DCID identifies the call association at the receiving end and is created at the destination exchange. The first Originating Call Identifier value received is reflected as the Destination Call Identifier value. The call identifiers at the originating and destination exchanges remain constant as long as a signalling association belonging to a multiconnection call is present. The call identifiers are independently assigned by each of the originating and destination exchanges concerned, A and B, enabling each exchange to uniquely identify the signalling associations belonging to a multiconnection call.

The originating call identifier A is assigned by the originating exchange A, when sending the first message for the first signalling association belonging to a multiconnection call, it is used to identify the signalling associations belonging to a multiconnection call at the originating exchange A.

The originating call identifier B is assigned by the destination exchange B, when receiving the first message for the first signalling association belonging to a multiconnection call, it is used to identify the signalling associations belonging to a multiconnection call at the destination exchange B.

The destination call ID A equals the originating call ID A, and the destination call ID B equals the originating call ID B.

The first initial address message of a signalling association belonging to a multiconnection call shall contain the OCID—A.

The succeding IAM messages relative to the same multiconnection call shall contain the DCIB-B.

In the destination exchange, the first backward message sent after the Ink message for the first connection shall contain the OCID-B and the DCID-A.

The OCID and DCID parameters are only processed by the originating and the destination exchanges. These parameters convey transparently through all intermediate exchanges in the B-ISDN network and have no U;I significance. The signalling with the OCID and DCID according to what is described above is performed in the higher B-ISDN layers and is relevant to the ATM NNI (Network Node Interface), more specific according to the. B-ISUP protocol shown in FIG. 1. As also can be seen in the figure, the B-ISUP only handles the signalling on the ATM NNI level where it serves to guarantee unique connection identifiers between originating and destination exchange. The B-ISUP operates over the Message Transfer Protocol 3 (MTP3). This allows B-ISDN to operate directly over ATM networks. The series of ITU-T Recommendations Q.2761 through Q.2764 specify the B-ISUP protocol.

The invention on the other hand relates to broadband signalling at the user interface. (see FIG. 1a, 1b and 1c) i.e at the ATM UNI-level (User Network Interface) where a need of a Connection Correlation Identifier (CCID) has been identified, in order to coordinate the individual connections with the respective multiconnection call. This is needed because in a private network it will be possible to route the individual connections of the call differently.

The B-ISUP protocol for multiconnection calls has to support the transfer of the values of the Connection correlation identifier.

The mechanism which will be further described is similar to the signalling according to the B-ISUP protocol. By using a similar mechanism as the B-ISUP at the ATM UNI, additional non-expexted advantages, which will be described, are obtained.

BRIEF DESCRIPTION OF THE DRAWINGS

The objects and advantages of the invention will be understood by reading the detailed description in conjunction with the drawings, in which.

DESCRIPTION OF THE INVENTION

This invention further relates to how to generate and use the Connection Correlation identifier for point to point multiconnection calls and proposes that the Connection Correlation identifier shall be composed of two parts, an originating part (OCCID) and a destination part (DCCID). The Connection Correlation identifier is always generated by the calling and called parties during call establishment and is used as mentioned above for broadband signalling at the user interface.

When the coordination process receives a new request to set up a connection it has to find out whether this new connection belongs to a completely new call or to an already active call with already zero or more connections. A call can consequently be regarded as active even when it has zero connections. This is possible due to something called prenegotiation which precedes connection setups. During this prenegotiation the calling party exchanges information with the called party, if he e.g is ready and able to accept a multiparty call. However, the coordination process has to be done within the network at the originating and destination interface as well as by both users, because each of them may receive requests for additional connections.

Figure 1A:
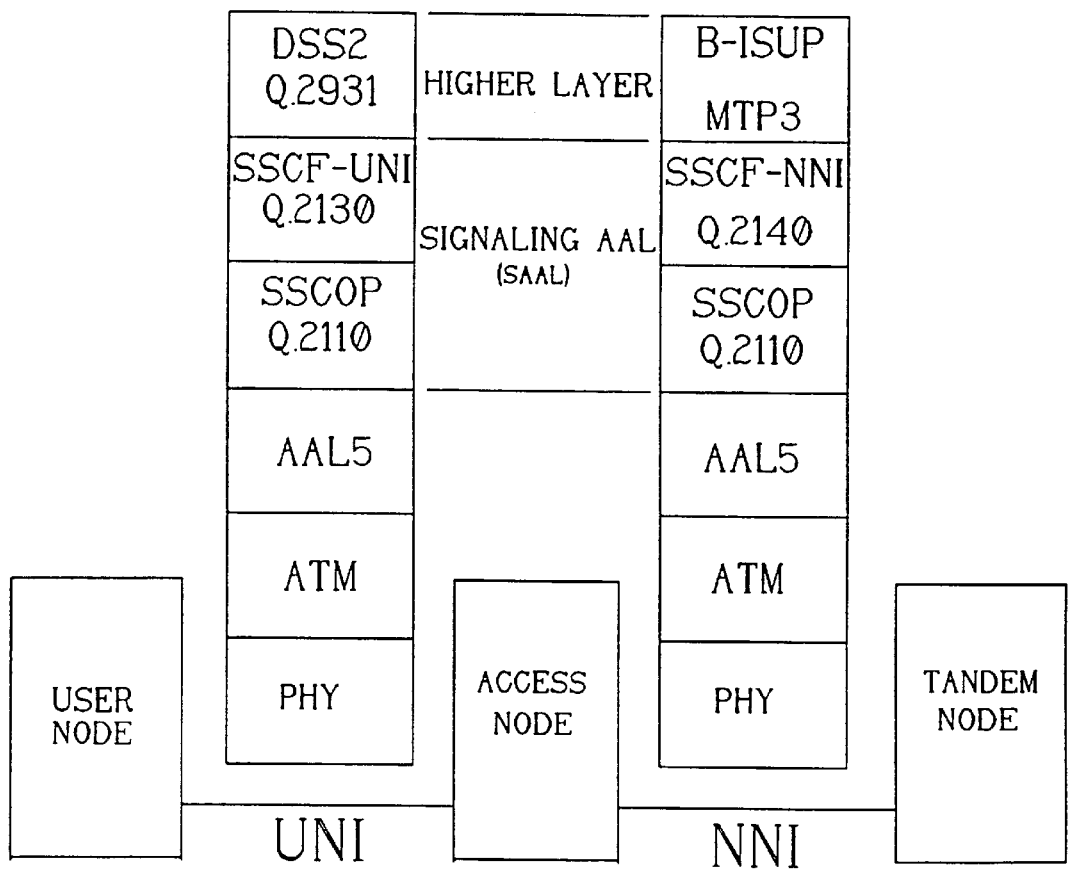
FIGS. 1A–1C illustrate the use of broadband signaling at the user interface.
Figure 1B:
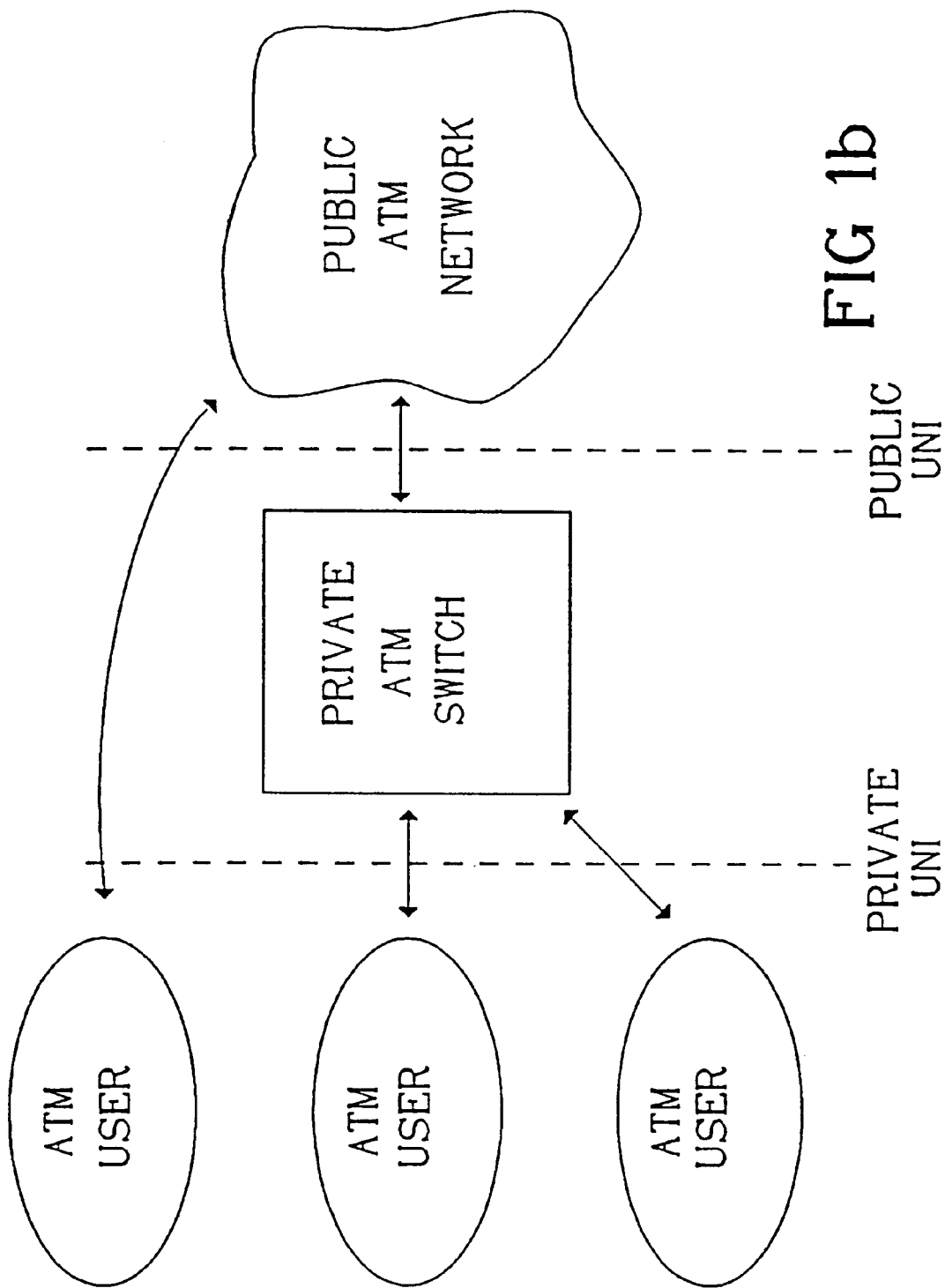
Figure 1C:
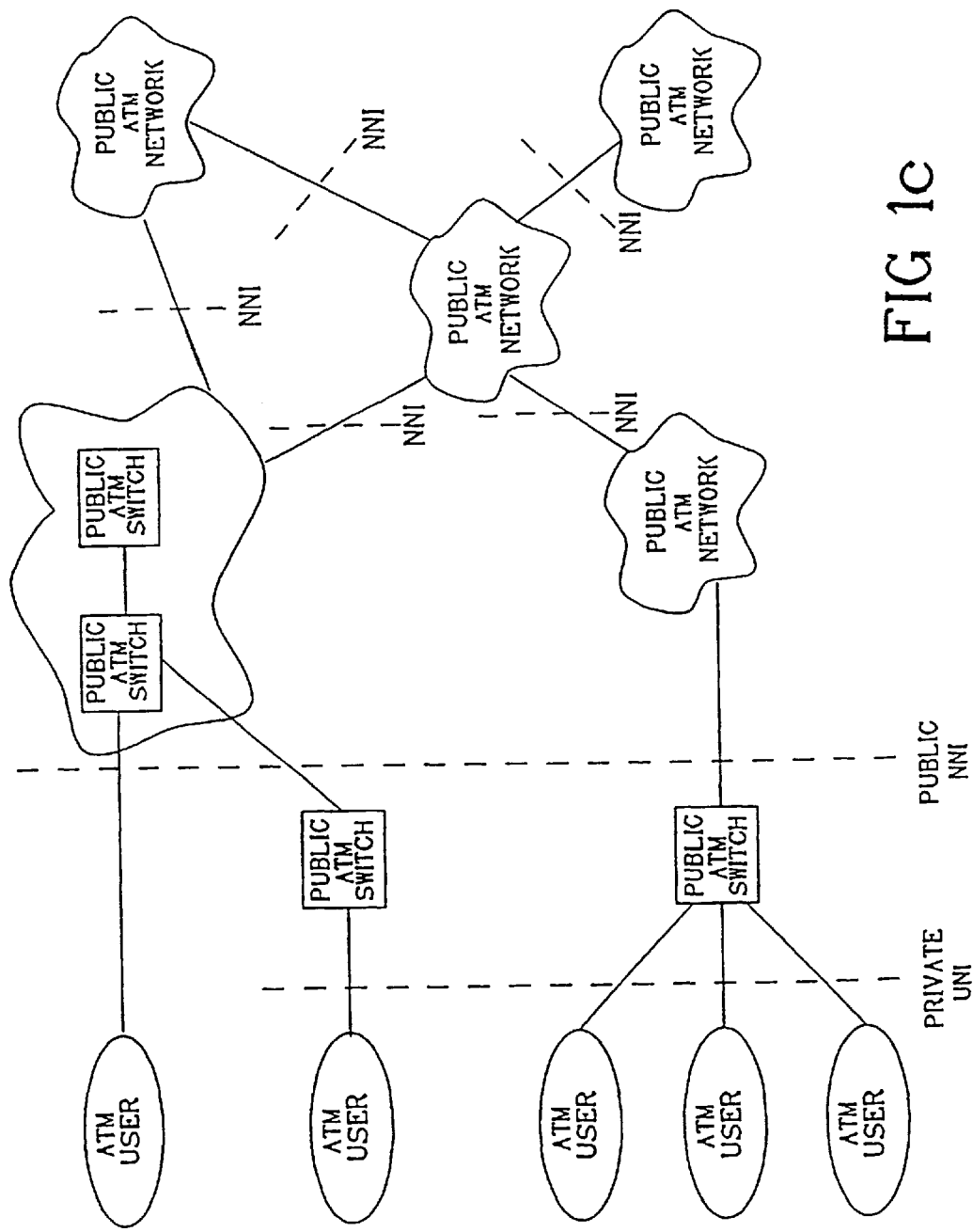

If two reference points at the originating and destination interface are defined as Sb and Tb, a scenario is possible where the points coincide. This scenario occurs when the calling party directly accesses a public ATM network and does not connect to any private switches in between (see FIG. 1b). Then the task mentioned above could be solved by using separate messages for establishing the call and additional connections. But for all other scenarios, where at least one private network is accessed, this solution does not work, because within the private network the individual connections can be routed differently. Thus, for example, the second connection may enter (or leave) the public network via another access. As a consequence of this it was decided by the ITU-T to always use an already known predefined signalling message called SETUP and to introduce the Connection correlation identifier. This leads to a simplification of the protocol by increasing the re-use of the ITU-T recommendation Q.2931 (se FIG. 1), which specifies the B-ISDN signalling on the ATM UNI, and by aiming at one solution (to be agreed) for both types of reference points.

To use and implement the signalling with the CCID according to the invention, the following description is valid and functioning for both interfaces, the scenario with the coincident Sb and Tb reference point and also for the Tb reference point for interworking with private ISDNs:

The Connection correlation identifier (CCID) shall, as mentioned, be composed of two parts, an originating part (OCCID), and a destination part (DCCID). Both values shall represent together a global identifier which has user-to-user significance.

The CCID shall always be created in conjunction with call establishment. The mechanism is similar to the one used for the B-ISUP to guarantee unique connection identifiers (OCID-A, DCID-A, OCID-B, DCID-B) between originating and destination exchange.

Generation of the CCID, if the call is established together with the first connection:

The calling user assigns a OCCID and includes it in the SETUP message together with a dummy value for the DCCID. Due to the dummy DCCID, the network at the originating interface recognize that the requested connection belongs to a new call. The content of the CCID shall be transferred unmodified through the network. At the destination interface the network includes the CCID without any modifications into the SETUP message, which is then sent towards the called user.

Upon receiving the SETUP message with the dummy DCCID, the called user recognizes that the requested connection shall belong to a new call. The called user assigns a DCCID, which will be sent back in the CONNECT message together with the unmodified OCCID. The CONNECT message is also a predefined signalling message.

Thus the network at the destination interface receives the completely composed CCID, stores it for later coordination purposes and forwards it to the originating interface. There the network stores it again for later coorrdination purposes and also transfers it in the CONNECT message towards the calling user.

Handling of additional error conditions:

If the network or the called user receives a SETUP message with a dummy value for the OCCID, the message shall be ignored. If the network or the calling user receives a CONNECT message with a dummy value for the DCCID, then clearing shall be invoked.

Generation of the CCID, if the call is established with prenegotiation:

The same principles as if the call is established together with the first connection apply. In addition the CCID may also be included in the FACILITY message, which also is a predefined signalling message that is used during the prenegotiation.

The conceivable possibilities for the transfer of the CCID are to introduce an additional information element in the FACILITY message or to extend the prenegotiation operation.

Usage of the CCID, if additional connections are requested:

Both, calling user and called user, can request simultaneously several additional connection requests (i.e become connection owner). The SETUP messages used for this shall include the CCID.

Upon receiving the SETUP message with a complete CCID (without dummy values) the network shall register it if not already known (this is possible at the pure Tb reference point). Then the connection request is transferred through the B-ISDN together with the CCID. At the receiving side the network shall also register the CCID, if unknown. Then the CCID shall be sent within the SETUP message to the non-connection owner. The non-connection owner shall validate the CCID before accepting a request for the additional connection.

Handling of additional error conditions:

If the non-connection owner receives from the network a SETUP message with an unknown CCID, then the message shall be ignored. (Note: in case of coincident Sb and Tb reference point an invalid CCID could also be recognized earlier. But it is recommended to use the procedure indicatde above which works with all configurations of the reference points.)

Figure 2:
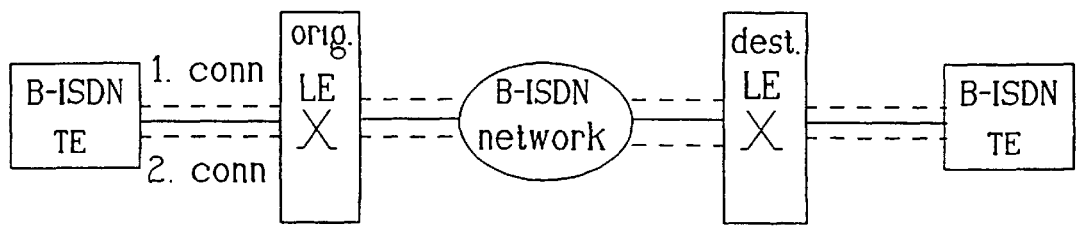
FIG. 2 illustrates the establishment of a multiconnection call according to an embodiment of the invention.
Figure 2:
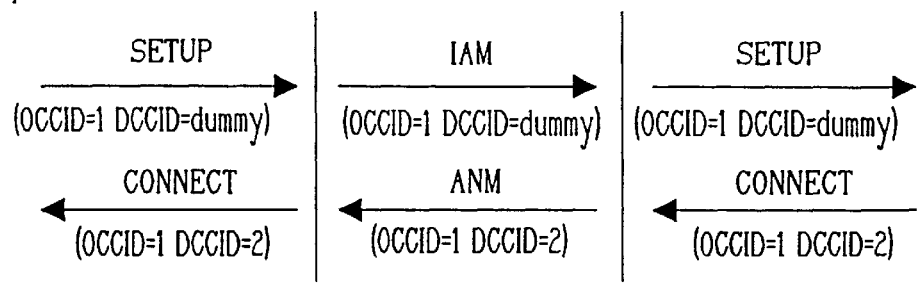
Figure 2:
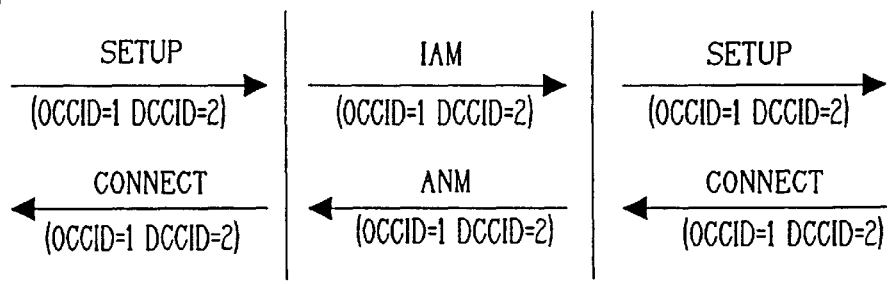

The following paragraphs discloses four different scenarios which can occur within the embodiment of the invention. They are all illustrated with drawings:

FIG. 2 depicts a succesful establishment of a multiconnection call without different routing in the private network and is valid for both types of reference points. It shows that it is the called and the calling party that creates the OCCID and the DCCID and that curing the setup of the second connection the complete CCID is set before the connecting procedure so as for the system to know that it is a multiple call that correlates to the first call.

Figure 3:
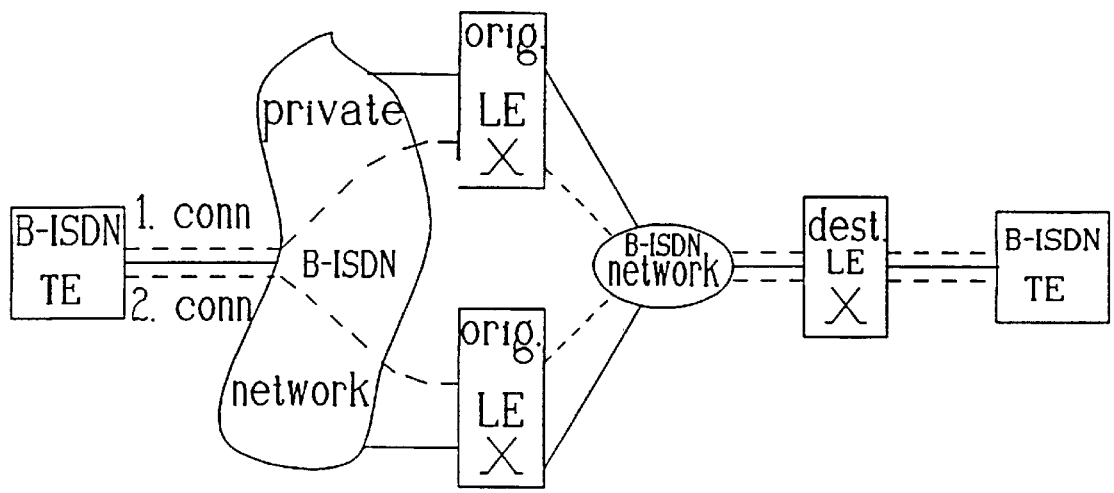
FIG. 3 illustrates the establishment of a multiconnection call according to another embodiment of the invention.
Figure 3:
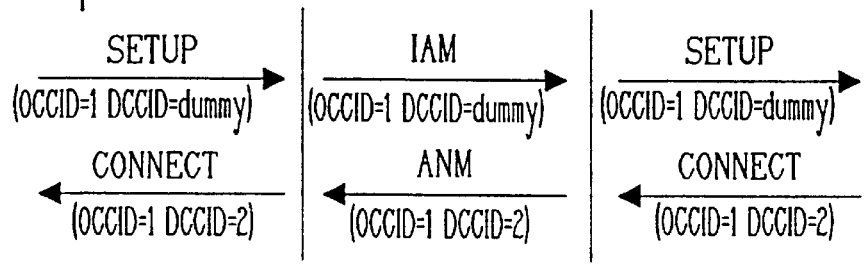
Figure 3:
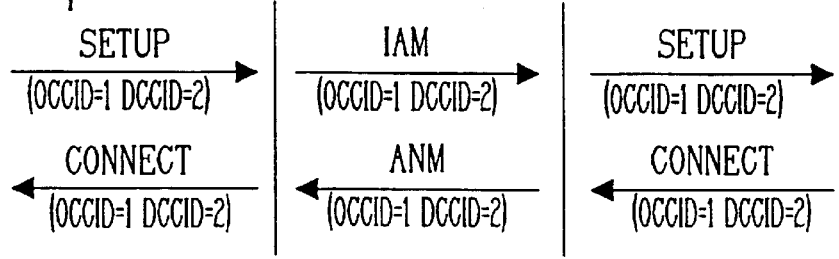

FIG. 3 depicts a succesful establishment of a multiconnection call with different routing in the private network and shows that the terminals are able to correlate the two connections to the same call.

Figure 4:
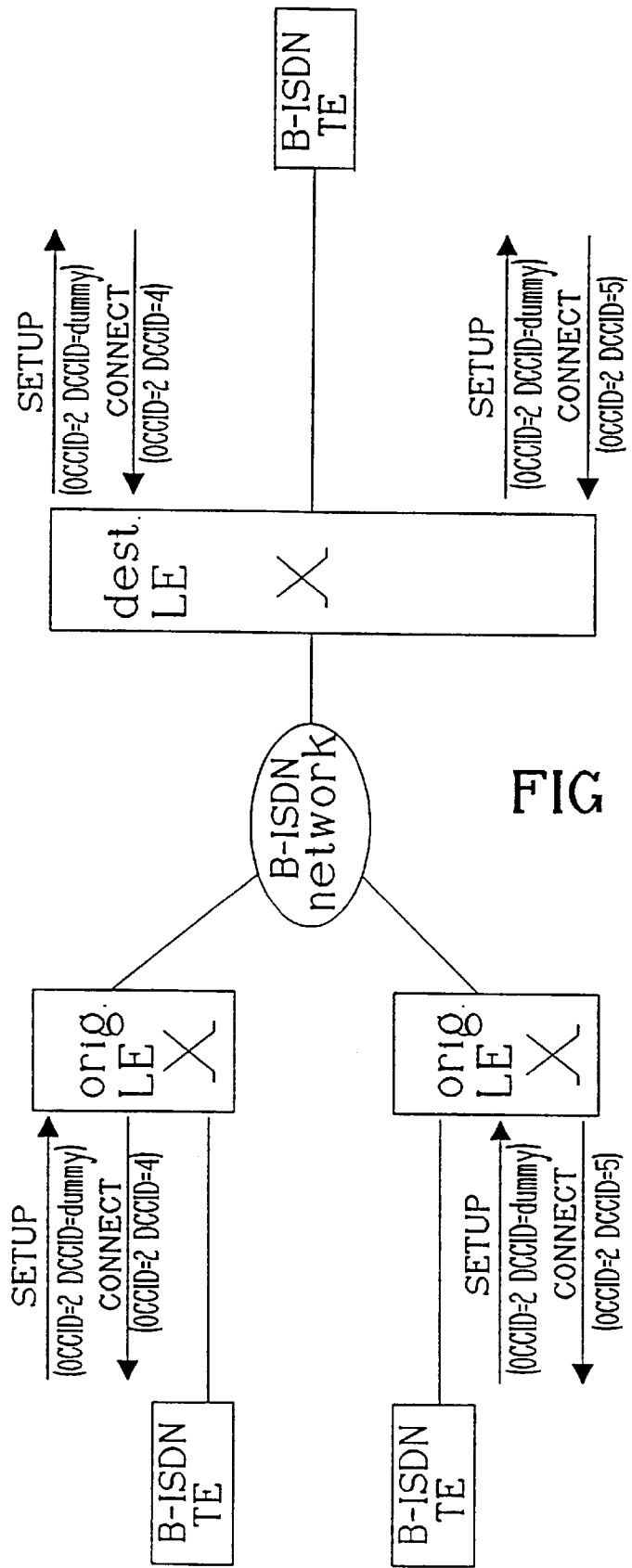
FIG. 4 illustrates the establishment of two multiconnection calls according to an embodiment of the invention.

FIG. 4 depicts an establishment of two multiconnection calls. In the example two users request for a multiconnection call to the same destination. Both terminals generate the same OCCID for the multiconnection call. The destination user may not generate the same DCCID again. So for each multiconnection call a unique DCCID is created. The same situation applies also if on the left hand the two terminals are connected to the same exchange.

Figure 5:
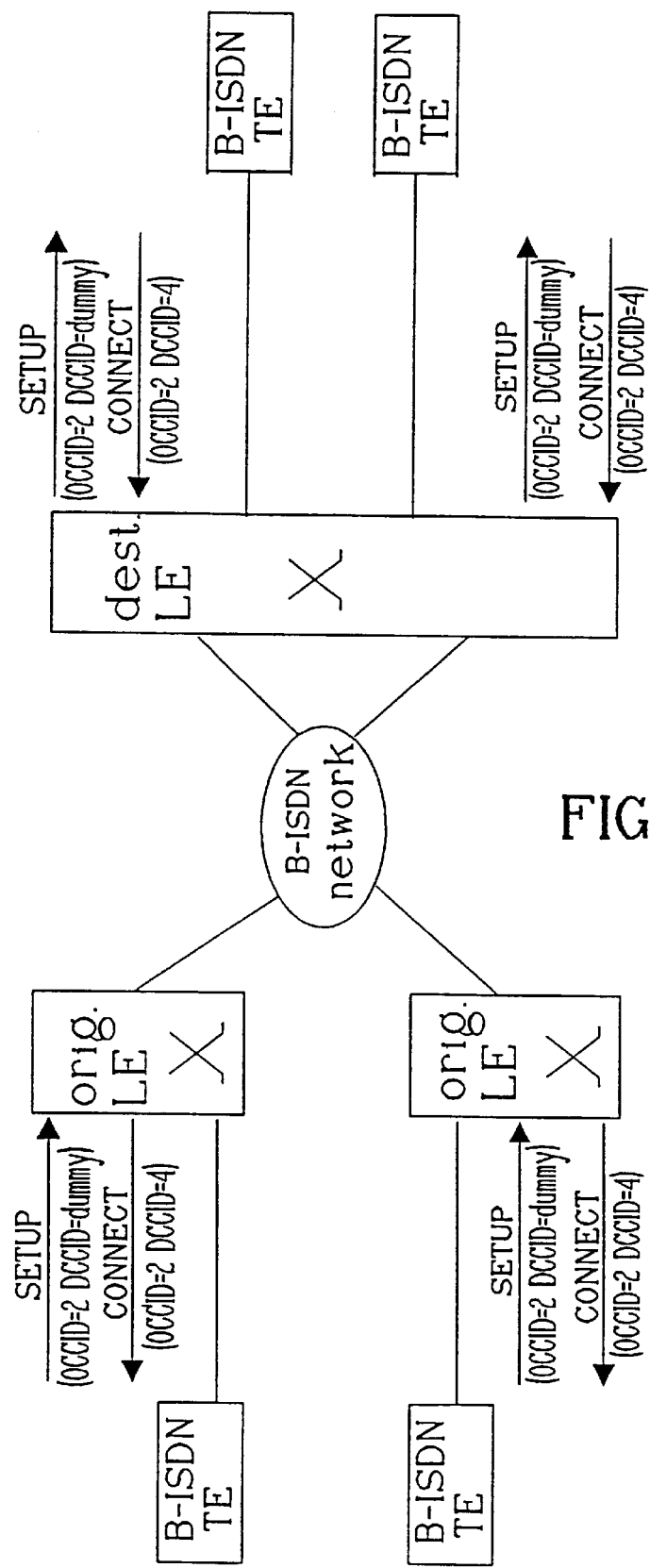
FIG. 5 illustrates the establishment of two multiconnection calls according to another embodiment of the invention.

FIG. 5 depicts multiconnections call requests for different destinations indicating the same OCCID. In the example two user request for a multiconnection call towards different called users. When receiving the call request, each called user may generate the same DCCID without a mix-up of the calls.

To conclude, the invention aims to enable the coordination processes to assign connections to the right call by the use of a Connection correlation identifier composed of two parts, one provided from the calling user, and one provided from the called user. It will also enable the coordination process of the network to decide if a new call has to be established (just because not both parts of the Connection correlation identifier are available).

The fact that the identifier has an originating and terminating part, no user can achieve a situation of having two multiconnection calls with identical values of the Connection correlation identifier. It shall be noted, that from the network point of view, uniqueness is not required.

Another advantage that is obtained by using the invention is that there is no need to introduce different procedures for the two types of reference points, the invention handles the coincident Sb and Tb reference point as well as the Tb reference point for interworking with private ISDN:s A liason statement has to be written to achieve that the CCID can be transformed transparently through the B-ISDN.

What is claimed is:

1. A method for signalling in broadband networks at the user interface, the method comprising:
   requesting establishment of a call;
   exchanging information between a calling party and a called party; and
   generating a connection correlation identifier (CCID), wherein the connection correlation identifier:
      coordinates the individual connections with the respective multiconnection call;
      is generated by the calling and called parties during call establishment, and
      is composed of two parts, an originating part and a destination part.

2. A method for signalling in broadband networks according to claim 1, wherein the step of generating the connection correlation identifier further comprises:
   assigning, by the calling party, an Originating connection correlation identifier (OCCID) during a call establishment together with the setup of the first connection of a multiconnection call or together with the prenegotiation and assigning the Destination connection correlation identifier (DCCID) a dummy value, and
   assigning by the called party a valid DCCID value if it receives a dummy value, to complete the CCID.

3. A method for signalling in broadband networks according to claim 2, wherein the calling and called party use the complete CCID, that was created during the setup of the first connection of a multiconnection call or during the prenegotiation, in all other connections of the same multiconnection call.

4. A method for signalling in broadband networks according to claim 1, wherein the originating part of the connection correlation identifier is assigned by the calling party and the destination part is assigned by the called party.

5. A method for signalling in broadband networks according to claim 4, wherein the connection correlation identifier is generated when the call is established with the first connection.

6. A method for signalling in broadband networks according to claim 4, wherein the connection correlation identifier is generated when the call is established with the prenegotiation.

7. A system for signalling in broadband networks at the user interface, the system comprising:
   means for requesting a connection setup;
   means for exchanging information between a calling party and a called party; and
   means for generating a Connection correlation identifier (CCID), wherein said connection correlation identifier:
      coordinates the individual connections with the respective multiconnection call
      is generated by the calling and called parties during call establishment, and
      is composed of two parts, an originating part and a destination part.

* * * * *